(12) United States Patent
Rasanen

(10) Patent No.: US 7,769,382 B2
(45) Date of Patent: Aug. 3, 2010

(54) INTERWORKING BETWEEN RADIO ACCESS NETWORKS

(75) Inventor: Juha Rasanen, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 52 days.

(21) Appl. No.: 09/911,219

(22) Filed: Jul. 23, 2001

(65) Prior Publication Data

US 2002/0045447 A1   Apr. 18, 2002

Related U.S. Application Data

(63) Continuation of application No. PCT/EP99/00452, filed on Jan. 25, 1999.

(51) Int. Cl.
*H04W 36/00* (2009.01)
(52) U.S. Cl. .................. 455/436; 455/432.2; 455/435.2
(58) Field of Classification Search ......... 455/436–444, 455/432, 433, 422, 452, 453, 445; 370/329–338, 370/352, 353, 351
See application file for complete search history.

(56) References Cited

U.S. PATENT DOCUMENTS

| | | | | |
|---|---|---|---|---|
| 5,408,419 | A * | 4/1995 | Wong | 709/225 |
| 5,504,935 | A * | 4/1996 | Vercauteren | 455/438 |
| 5,737,703 | A * | 4/1998 | Byrne | 455/442 |
| 5,793,762 | A * | 8/1998 | Penners et al. | 370/389 |
| 5,826,188 | A * | 10/1998 | Tayloe et al. | 455/428 |
| 5,862,480 | A * | 1/1999 | Wild et al. | 455/432.2 |
| 5,878,349 | A * | 3/1999 | Dufour et al. | 455/438 |
| 5,884,157 | A * | 3/1999 | Karmi | 455/406 |
| 5,912,885 | A * | 6/1999 | Mitts et al. | 370/331 |
| 5,953,319 | A * | 9/1999 | Dutta et al. | 370/238 |
| 6,119,003 | A * | 9/2000 | Kukkohovi | 455/435.2 |
| 6,151,495 | A * | 11/2000 | Rune | 455/426 |
| 6,157,834 | A * | 12/2000 | Helm et al. | 455/436 |
| 6,256,497 | B1 * | 7/2001 | Chambers | 455/433 |
| 6,374,112 | B1 * | 4/2002 | Widegren et al. | 455/452 |
| 6,377,804 | B1 * | 4/2002 | Lintulampi | 455/435 |

(Continued)

FOREIGN PATENT DOCUMENTS

EP          0 504 122 A2 *   9/1992

(Continued)

*Primary Examiner*—Erika A Gary
(74) *Attorney, Agent, or Firm*—Squire, Sanders & Dempsey L.L.P.

(57) ABSTRACT

The present invention discloses a method of interworking between different radio access networks. In this method, a radio transceiver device capable of operating with the first radio access network and the second radio access network is attached to the first radio access network. The method comprises the steps of detecting a service request, accessing information on conditions for the first and the second radio access network for giving sufficient support for a service requested by the service request, analysing whether or not the first radio access network and the second radio access network meets the conditions, and initiating a handover of the radio transceiver device from the first radio access network to the second radio access network if the second radio access network meets the conditions but the first radio access network does not. Thus, the method according to the present invention serves to support dual mode mobile stations and networks in such a way that the correct radio access which sufficiently supports a requested service is automatically obtained.

24 Claims, 5 Drawing Sheets

U.S. PATENT DOCUMENTS

| | | | |
|---|---|---|---|
| 6,393,047 B1 * | 5/2002 | Popovic' | 375/140 |
| 6,400,946 B1 * | 6/2002 | Vazvan et al. | 455/432 |
| 6,477,370 B1 * | 11/2002 | Sigler et al. | 455/427 |
| 6,771,964 B1 * | 8/2004 | Einola et al. | 455/437 |

FOREIGN PATENT DOCUMENTS

| | | |
|---|---|---|
| EP | 0 961 5123 A1 * | 1/1999 |
| JP | 05-041687 | 2/1993 |
| JP | 08-317452 | 11/1996 |
| JP | 08-322075 | 12/1996 |
| WO | WO 93/06683 A1 * | 4/1993 |
| WO | WO 95/24809 A1 * | 9/1995 |
| WO | WO 96/28947 | 9/1996 |
| WO | WO 97/15160 A1 * | 4/1997 |
| WO | WO 98/51102 | 11/1998 |
| WO | WO 98/59513 | 12/1998 |

* cited by examiner

INTERWORKING BETWEEN RADIO ACCESS NETWORKS

This application is a continuation of international application serial number PCT/EP99/00452, filed 25 Jan. 1999.

FIELD OF THE INVENTION

The present invention relates to a method of interworking between different radio access networks which support different services or which support services with different qualities.

BACKGROUND OF THE INVENTION

The evolutionary development of the so-called $2^{nd}$ generation mobile networks towards the so-called $3^{rd}$ generation networks leads to network configurations where both, $2^{nd}$ and $3^{rd}$ generation radio access networks, operate with the same core network CN. In the first phase such $3^{rd}$ generation radio access networks RAN will cover only hot spots, i.e. regions with high radio traffic load, later they will cover wider and wider areas.

Thus, radio transceiver devices will have to be introduced which will be able to operate with either of the radio access networks. This kind of radio transceivers is referred to as dual mode mobile stations MS.

In the GSM network two different accesses exist, i.e. GSM 900 and GSM 1800 However, the GSM 900 and 1800 dual access differs from the situation described above in that the GSM 900/1800 dual access offers the same services to the subscribers through both accesses, whereas in the $2^{nd}/3^{rd}$ generation dual access the difference between the two radio access methods and the development of the core packet network lead to a situation where the same services are not necessarily specified, not to mention implemented in both the $2^{nd}$ and $3^{rd}$ generation accesses. Even if the same services are specified, it may not be profitable nor reasonable to implement them in all networks.

There are several services that most probably will be supported by only one of the radio access network types. Such services are, for example, non-transparent circuit-switched services which are redundant in the $3^{rd}$ generation radio access network, but which are widely used in the $2^{nd}$ generation radio access network (GSM network).

Furthermore, transparent circuit-switched services are redundant in the $3^{rd}$ generation radio access network, since the $3^{rd}$ generation access network will be able to support a real-time packet transmission. On the other hand, transparent circuit switched services provide the only real-time service in GSM.

Moreover, real-time packet services are not available in GSM, whereas these services are available and important in the $3^{rd}$ generation radio access network.

Thus, these circuit-switched services are very important in the current GSM networks. They will also be important in the foreseeable future because of their wide acceptance and introduction in the networks and because the forthcoming GSM packet service (GPRS) cannot support real-time transmission.

In contrast thereto, the $3^{rd}$ generation network (UMTS, (universal mobile telephone system) will be able to support real-time packet transmission. This will make circuit-switched services redundant. Especially the implementation of the non-transparent circuit-switched services in the $3^{rd}$ generation access will be questionable due to their redundancy, complexity and costs involved.

Thus, the dual mode mobile stations will have to operate in networks with various degrees of service support. Some $3^{rd}$ generation accesses will support only packet services, some both packet services and transparent circuit switched services, some may even support both packet services and non-transparent circuit-switched services (if ever specified for $3^{rd}$ generation radio access network). Some $2^{nd}$ generation accesses will support only circuit-switched services, some both circuit-switched and (non-real-time) packet services.

Therefore, a new situation for the mobile stations arises. On the one hand, it is possible that a mobile station is attached to a $3^{rd}$ generation cell and is requested (or requests itself) a service supported only by the $2^{nd}$ generation access. Vice versa, it is also possible that a mobile station is attached to a $2^{nd}$ generation cell and is requested (or requests itself) a service supported only by the $3^{rd}$ generation access.

This leads to the drawback that in these situations only those services can be requested and used which are common to both a $2^{nd}$ generation radio access network and a $3^{rd}$ generation radio access network.

In addition, in case of services supported by both networks, there are several services which are supported with different qualities by different radio access networks. For example, the different radio access networks can provide different communication bit rates. Moreover, the price of connection can be different. For example, UMTS will be most probably more expensive in beginning, whereas later on GSM could be more expensive. Furthermore, the same services can be provided with different delays. In the prior art, these differences are not taken into account.

Thus, the above described drawbacks of the prior art result in a limited usability of a respective mobile station.

SUMMARY OF THE INVENTION

Hence, the object underlying the present invention resides in providing a method by which the above described drawbacks are removed.

This object is achieved by a method of interworking between different radio access networks. In detail, in this method, a radio transceiver device capable of operating with the first radio access network and the second radio access network is attached to the first radio access network. The method comprises the steps of detecting a service request, accessing information on conditions for the first and the second radio access network for giving sufficient support for a service requested by the service request, analysing whether or not the first radio access network and the second radio access network meets the conditions, and initiating a handover of the radio transceiver device from the first radio access network to the second radio access network if the second radio access network meets the conditions but the first radio access network does not.

As an alternative, according to the invention the above object is solved by a network interworking device for a telecommunication network comprising at least two radio access networks. For this device, a radio transceiver device capable of operating with the first radio access network and the second radio access network is attached to the first radio access network. The device comprises a detecting means for detecting a service request. Furthermore an analysing means responsive to the detecting means is provided which comprises the functionality of accessing information on conditions for the first and the second radio access networks for giving sufficient support for the a service requested by the service request and analysing whether or not the first radio access network and the second radio access network meet the conditions. Moreover, the network interworking device comprises initiating means responsive to the analysing means, the initiating means being adapted to initiate a handover of the radio transceiver device from the first radio access network to the second radio access network if the respective conditions are not met by the first radio access network but by the second radio access network.

Further advantageous developments are defined in the dependent claims.

By the above-mentioned method, the drawbacks of the prior art are removed. That is, by the method according to the invention, a situation can be handled in which a service is provided which is not supported by a currently used radio access network but by another one. This is achieved by effecting a handover from the first to the second radio access network.

In addition, it is also possible to initiate a handover in case a service is more sufficiently supported by the second radio access network than by the first one. Thus, the present invention provides a more flexible usability of the mobile stations.

BRIEF DESCRIPTION OF THE DRAWINGS

The present invention will be more readily understood with reference to the accompanying drawings in which.

DETAILED DESCRIPTION OF PREFERRED EMBODIMENTS

According to the invention, a service request is analysed and compared with the capabilities of a first radio access network RAN-A on which a mobile station is currently located.

If the radio access network RAN-A does not support the requested service or does not support the requested service sufficiently, but the core network does support the service, a handover is initiated to the other radio access network RAN-B which supports the requested service sufficiently and has coverage in the area.

Thus, the method according to the present invention serves to support dual mode mobile stations and networks in such a way that the correct radio access which supports the requested service sufficiently is automatically obtained.

This method can be performed in a network control device (for example, a mobile services switching center, MSC, or an interworking unit, IWU, or a base station controller, BSC, or a packet network node, PNN) or in the radio transceiver device (mobile station). The method can be performed by the network control device in case the service requested is specified, for example, in international standards, but not implemented in the network. In contrast thereto, if it is not specified, the method can be carried out either in the radio transceiver device or in the network control device.

Hereinafter, the general network architecture is described with reference to FIG. 1.

A core network CN comprises at least one packet network node PNN and one MSC (mobile services switching center) and one IWU (interworking unit). For simplifying the diagram, the interconnections between the PNN, the MSC and the IWU are not shown. The core network CN (i.e., the PNN, the MSC and/or the IWU) communicates with a radio access network RAN-A and a radio access network RAN-B. Each radio access network has at least one base station controller BSC_A and BSC_B.

Figure 1:
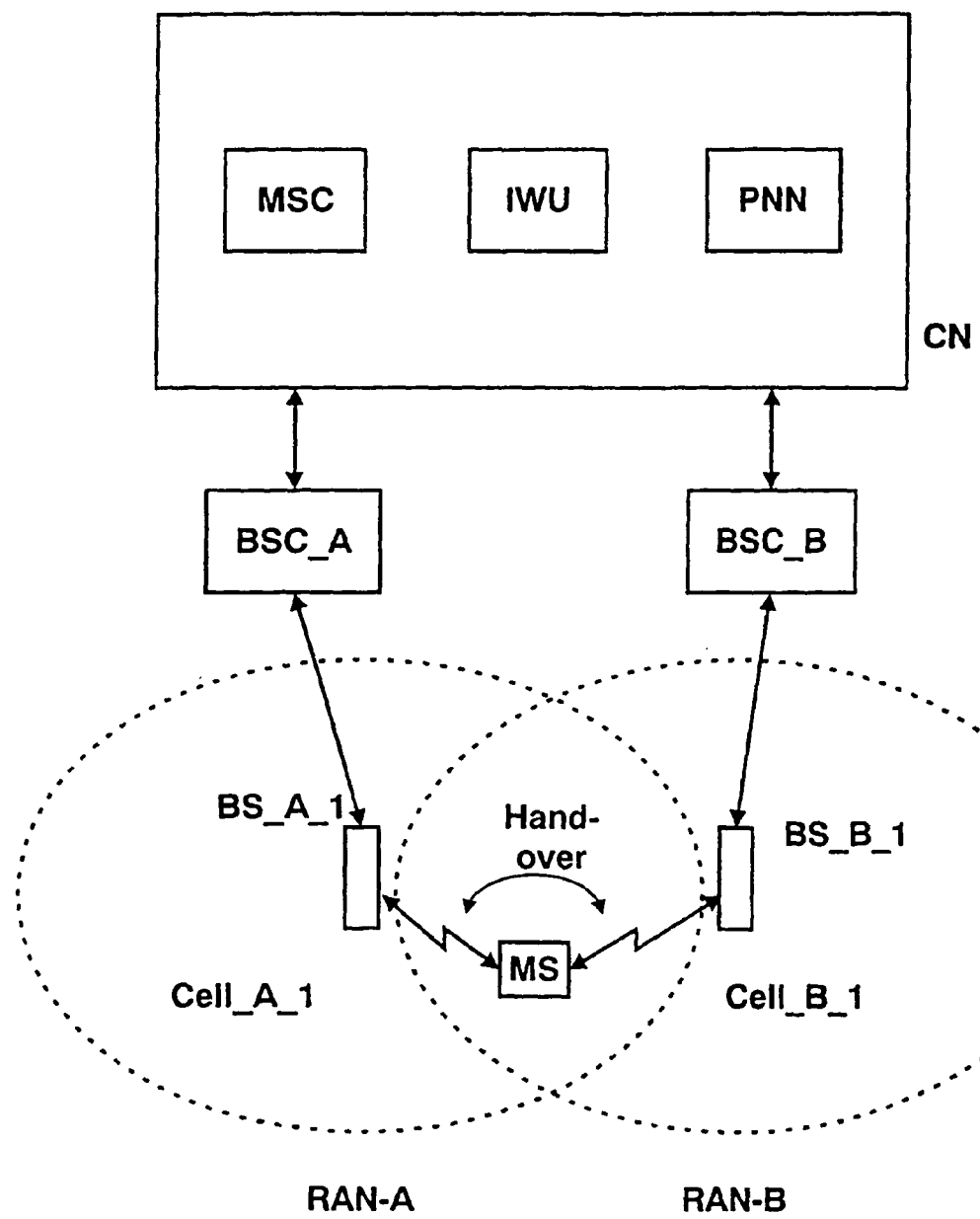
FIG. 1 shows a general network architecture in a schematic block diagram.

In this example, only one cell Cell_A_1 of the network RAN-A and one cell Cell_B_1 of the network RAN-B are shown in FIG. 1. The cell Cell_A_1 is provided with a base station BS_A_1, and the cell Cell_B_1 is provided with a base station BS_B_1. The base stations BS_A_1 and BS_B_1 communicate with the base station controllers BSC_A and BSC_B.

The cells Cell_A_1 and Cell_B_1 have an overlapped region in which the radio access network RAN-A and the radio access network RAN-B can be accessed.

For the purpose of following description, it is assumed that a mobile station MS is located in this overlapped region. The mobile station MS is capable of communicating with both radio access networks. That is, the mobile station MS is adapted to both radio access networks and is present in the same coverage area. For example, the mobile station MS may be a dual mode phone.

Depending on the reason why a service is not supported by the first radio access network RAN-A sufficiently, there are various scenarios as to how, and by which means, the method of the present invention can cope with these situations.

In principle, the method can either be carried out in the mobile station MS or in the network controlling device MSC or IWU or BSC or PNN. Hereinafter, these two cases are described in two embodiments. Moreover, in both cases it can further be distinguished between a mobile-originated and a mobile-terminated case.

First Embodiment

The first case is described as a first embodiment of the invention. In this embodiment, a method is described which is performed in a network control device (e.g., MSC, IWU, BSC or PNN) of the core network CN.

It is assumed that a mobile station MS is located in the first radio access network RAN-A. The mobile station MS requests a service which is specified (for example, in international standards) but which is not implemented in the first radio access network. Since the service is specified in general, the mobile station can assume that the service is also specified in the current first radio access network RAN-A. However, the mobile station MS cannot know whether this service is implemented in the network or not, that is, whether the requested service is supported by the first radio access network RAN-A or not.

On the other hand, the network is aware of its capabilities. Hence, the network control device (e.g. MSC or IWU or BSC or PNN) can determine whether the network supports the requested service or not. In case the network does not support the requested service, the network can initiate a handover to another radio access network which supports this service and which has coverage in the area where the mobile station is located.

The same process can be carried out in case a requested service is supported by both radio access networks, but the requested service is supported more sufficiently by the second radio access network.

Thus, the requested service is analysed whether it is supported or not and whether there is a more sufficient support of this service by another radio access network. That is, the analysis is carried by analysing whether the radio access networks RAN-A and RAN-B meet certain conditions with respect to the requested service.

The simplest condition is whether the requested service exists in the radio access network in question, i.e., in the radio access network RAN-A or not. Other conditions could be, for example, a condition for the bit rate, delay requirements or the price of the connection.

In the following, an example is described in which a requested service is not supported by the first radio access network RAN-A.

This process is described with reference to a flowchart shown in FIG. 2.

In a first step S11, the process waits for a service request. When a service request is received, the process proceeds to a second step S12, in which the service request is analysed and compared with the capabilities of the radio access network RAN-A currently used by the mobile station MS. For example, the analysis could be effected by comparing the received service request with a set of services available in the radio access network RAN-A. The list of available services can be stored in a table or the like. If it is determined that the service request is supported sufficiently by the radio access network RAN-A, the process branches to a step S13 in which the normal processing of the service request within the network is performed.

On the other hand, if it is decided in step S12 that the requested service is not supported sufficiently (as described above) by the radio access network RAN-A but by a second radio access network RAN-B, the process branches to a step S14. In this step S14, a handover to the second radio access network RAN-B is initiated.

In the following, a more concrete example of the present embodiment is described, in which a service is implemented in only one of the two radio access networks. The core network can be a GSM core network comprising a GSM radio access network and a UMTS (universal mobile telephone system) radio access network. Non-transparent circuit-switched services are only implemented in the GSM network. In contrast thereto, the UMTS network supports packet services and, possibly, transparent circuit-switched services, but no non-transparent circuit-switched services.

Now it is assumed that a dual mode phone is located in a UMTS cell and requests a non-transparent circuit-switched data call. This could happen, for example, if a user wishes to communicate with a mail server of a company or with a remote access server. The non-transparent circuit-switched service is not supported by the UMTS network. However, it is specified there.

In this case, the above procedure is carried out. That is, the service request is analysed. The network controlling device, i.e. the IWU (interworking unit) or the MSC (mobile services switching center) of the radio access network, detects that the requested service, i.e. the non-transparent circuit-switched data call, cannot be performed in the UMTS network but is supported by the GSM network. Hence, a handover to the cell of the GSM network is initiated, which has coverage in the area of the cell of the UMTS network in which the mobile station MS is located.

Thus, according to the first embodiment, it is possible to execute a service which is requested by a mobile station and which is not supported by the currently used radio access network (RAN-A) by performing a handover to a second radio access network (RAN-B). Furthermore, it is possible to execute a requested service by that radio access network which supports the service more sufficiently. The necessary analysis of the service request is effected in the network control device (e.g. MSC or IWU or BSC) of the currently used radio access network (RAN-A), since the service is specified in general, but it is not clear to the mobile station MS whether this service is implemented in the currently used radio access network (RAN-A).

In the following, an example is described in which a requested service is supported by both radio access networks RAN-A and RAN-B.

Figure 2:
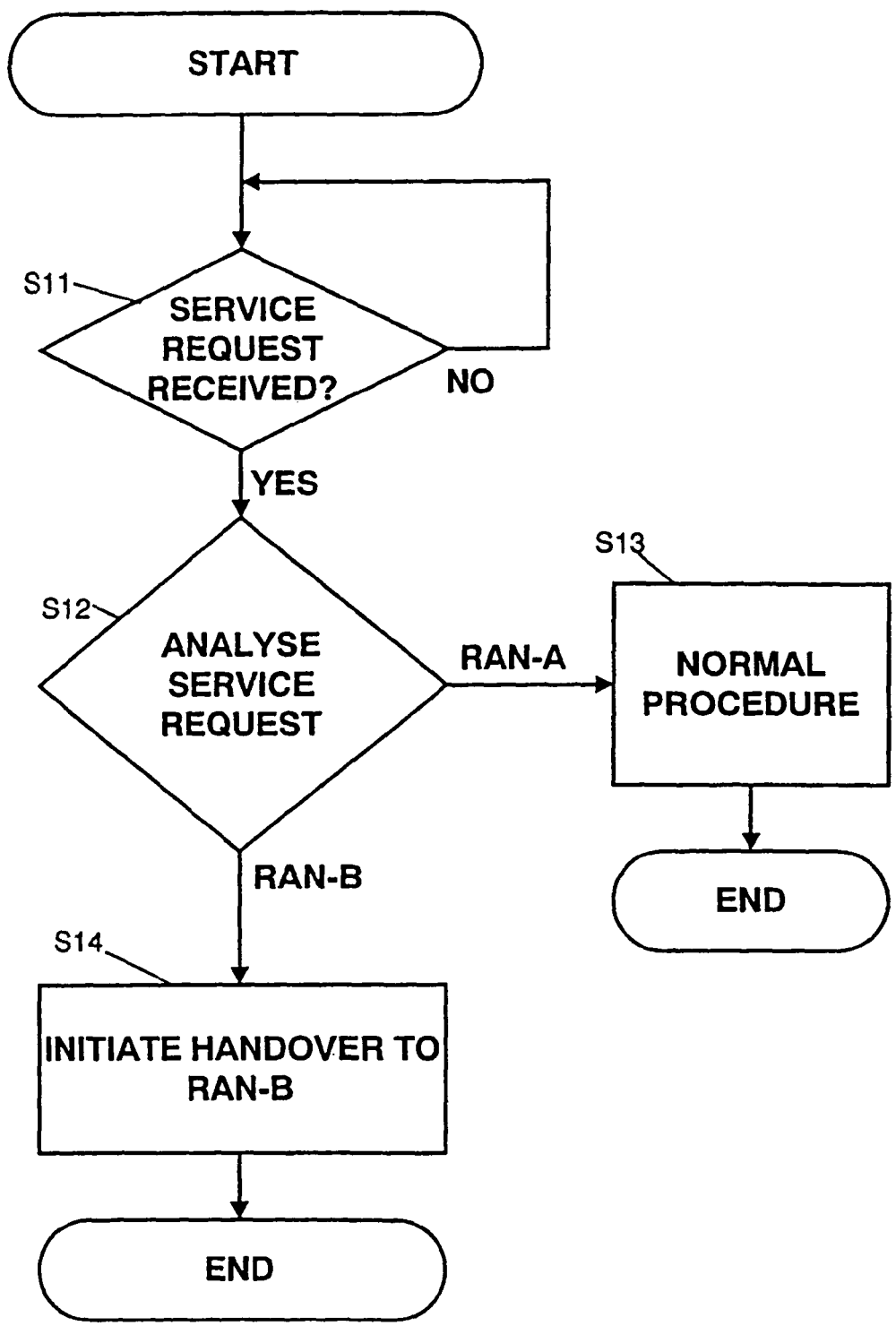
FIG. 2 shows a flowchart of a process performed by the network controlling device according to the first embodiment of the present invention.

In this case the process performed is the same as described with respect to FIG. 2. However, since in this case the condition is not only whether the requested service is present or not, the analysis step S12 shown in FIG. 2 is described in more detail with respect to FIG. 3.

For determining whether the first or the second radio access network supports the requested service more sufficiently, the conditions for this have to be specified. That is, it is analysed whether the second radio access network supports a service by a given amount better. This given amount can be defined by a norm or a threshold. In this example, the given amount can be, for example, 10% of the current bit rate of the first radio access network RAN-A. That is, in this case the condition for the second radio access network RAN-B supporting the requested service more sufficiently than the first radio access network RAN-A is the condition that the bit rate is at least 10% higher.

The conditions as to whether the first radio access network RAN-A supports the requested service more sufficiently than the second radio access network RAN-B can be set previously and stored in a database, for example.

Figure 3:
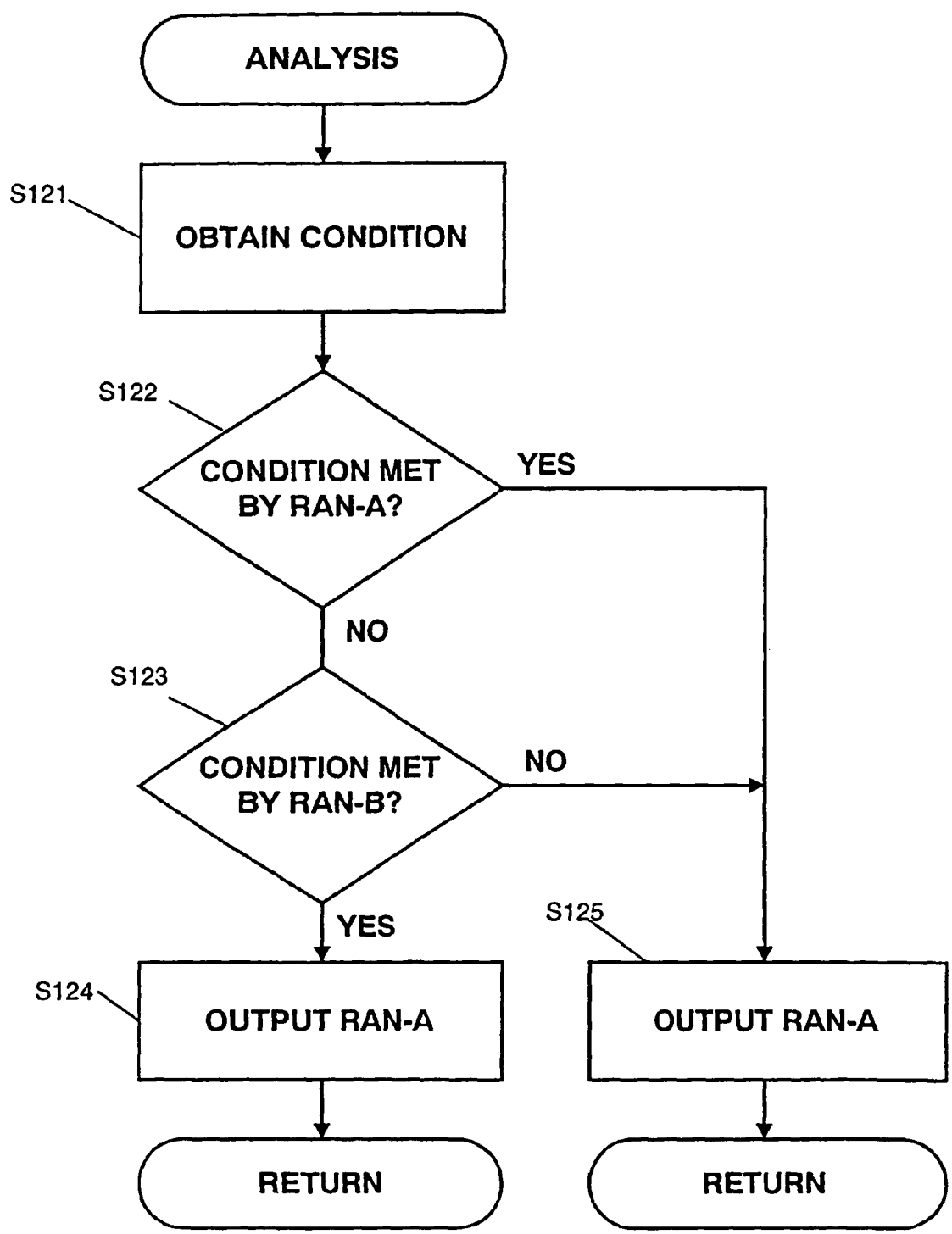
FIG. 3 shows a flowchart of a process performed in an analysing step S12 of FIG. 2.

In the process shown in FIG. 3, the condition is obtained in step S121. Then, it is determined whether the condition is already met by the currently used first radio access network RAN-A. In the above example of the bit rate, the desired bit rate is compared with the bit rate provided by the radio access network RAN-A, which can be supplied from the database, for example.

If it is determined in step S121 that the condition is met by the first radio access network RAN-A, the flow branches to a step S125 in which "RAN-A" as the result of the analysis is output. That is, in the process shown in FIG. 2, the flow branches to step S13, in which a normal procedure is carried out and the currently used radio access network RAN-A is maintained. That is, in the above example of the bit rate, "RAN-A" is output if the desired bit rate of 10% higher than the currently used bit rate can already be provided by the current radio access network RAN-A.

On the other hand, if it is determined in step S122 that the condition is not met by the first radio access network RAN-A, the process advances to step S123 in which it is determined whether the condition is met by the second radio access network RAN-B. If the condition is not met by the second radio access network RAN-B, the flow branches to the step S125. That is, the mobile station MS maintains the connection to the first radio access network RAN-A. In the above example of the bit rate, this occurs in case the bit rate is, for example, only higher by about 5%.

However, in case that the condition is met by the second radio access network RAN-B, the flow branches to a step S124, in which "RAN-B" is output as the result of the analysis step. That is, in the process shown in FIG. 2, the process advances to the step S14 in which a handover to the second radio access network RAN-B is initiated.

In the above example, the threshold by which the condition is analysed is set on such a value that a handover is not always initiated. That is, in the above example, it is taken into account that a handover is only initiated in case bit rate provided by the second radio access network RAN-B is considerably higher than the bit rate of the currently used radio access network RAN-A. As a matter of course, this threshold can be varied as necessary. That is, if it is desired, the threshold can be set such that the handover is initiated simply in case that the bit rate of the second radio access network RAN-B is higher.

Moreover, as a matter of course the condition for a handover from the first to the second radio access network is not limited on the bit rate but can be plurality of different conditions as the price of connection, delay requirements, stability of the connection (for example, signal strength etc.) and others.

Furthermore, a plurality of conditions can be combined or made dependent on each other. For example, a first condition for a service can be a higher bit rate, and a second condition the price of connection. A combined condition for initiating a handover to the second radio access network RAN-B can be that the second radio access network RAN-B has a considerably higher bit rate, but that the price of connection is only moderately higher than that of the currently used first radio access network RAN-A.

Modifications of the First Embodiment

In the preceding section, the first embodiment has been described for a mobile-originated case. However, the process according to this embodiment is also applicable to a mobile-terminated case. There, a service request from outside the radio access network in which the mobile station MS is located is to be analysed. Nonetheless, the above steps S12 to S14 remain the same.

Second Embodiment

Next, as a second embodiment, the above mentioned second case will be described in which the mobile station itself performs the analysis of a service request.

As in the above first embodiment, the mobile station MS is located in a cell of the first radio access network RAN-A. In principle, the same process performed in the network control device as according to the first embodiment can be carried out. However, in this case it is assumed that the mobile station MS requests a service which is not specified (for example, in international standards) for the RAN-A type access. Thus, the mobile station MS knows that this service is not supported by the radio access network in which it is located.

Consequently, in a mobile-originated case, the mobile station MS itself analyses the service request, which is issued by, for example, application software or the terminal (TE), i.e. the mobile station itself, and compares it to the capabilities of the currently used radio access network RAN-A. If it is determined that the radio access network RAN-A cannot support the requested service, but the second radio access network RAN-B can, the mobile station MS initiates or requests a handover to the RAN-B type of access.

Figure 4:
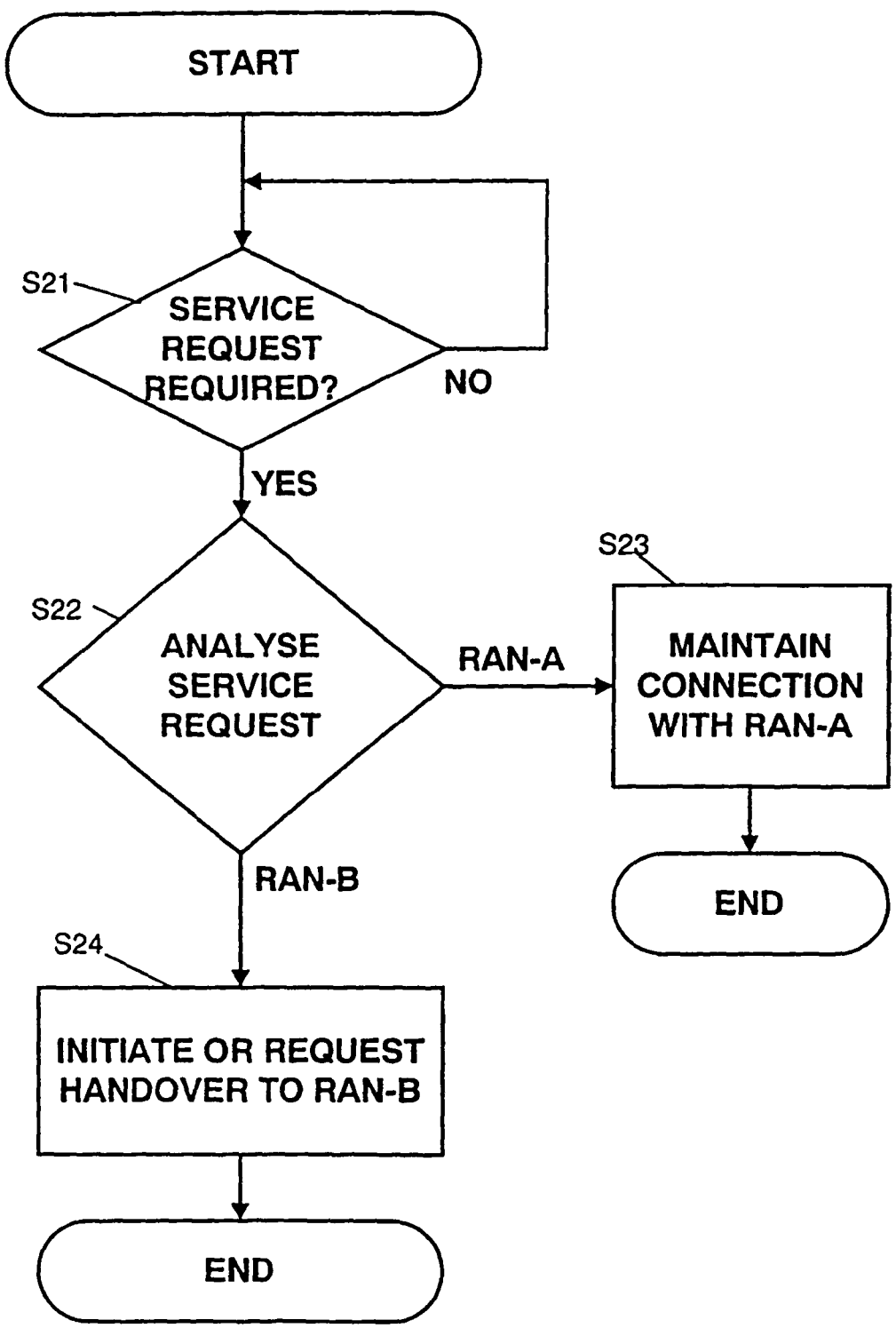
FIG. 4 shows a flowchart of a process performed by a radio transceiver device according to the second embodiment of the present invention.

The above process is described with reference to a flowchart shown in FIG. 4.

As mentioned above, this process is performed in the mobile station MS. In a first step S21, the process detects whether a service request is required or not. The service request can be issued by an application in the mobile station or by the terminal (TE), i.e. the mobile station itself. When it is detected that a service request is desired, the process proceeds to a second step S22. In this step S22, the service request is analysed and compared with the capabilities of the radio access network RAN-A currently used by the mobile station MS. The analysis can be similar to that in step S12 according to the first embodiment. If it is determined that the service request is supported or is supported more sufficiently by the currently used radio access network RAN-A, the process branches to a step S23 in which the connection with the radio access network RAN-A is maintained and the service request is issued.

On the other hand, if it is decided in step S22 that the service requested is not supported by the radio access network RAN-A (that is, is not implemented in the radio access network RAN-A), but by the second radio access network RAN-B, the process branches to a step S24. In this step 24, the mobile station MS itself initiates or requests a handover to the second radio access network RAN-B.

As in the description of the first embodiment, in the following a more concrete example of the second embodiment is described. Likewise as in the former example, the core network is a GSM core network comprising a GSM radio access network and a UMTS (universal mobile telephone system) radio access network. The UMTS supports packet service and, possibly, transparent circuit-switched services, whereas in the UMTS no non-transparent circuit-switched services are specified, since these services are regarded as redundant due to the presence of packet services.

In this situation, a dual mode phone is located in a UMTS cell. It is now assumed that the application or the user of the mobile station requests a non-transparent circuit-switched call. This could happen, for example, in case the user wishes to access a mail server of his company or a remote access server.

Now, the mobile station MS analyses the service request. The mobile station MS determines that the mobile station is currently located in a UMTS radio access network that does not support the non-transparent circuit-switched service. However, the GSM radio access network supports the requested service. Hence, the mobile station initiates or requests a handover to a cell of the GSM radio access network which has coverage in the area of the cell of the UMTS network in which the mobile station MS is located.

Thus, according to the second embodiment, it is possible to execute a service which is requested by a mobile station and which is not specified by the current radio access network (RAN-A) by performing a handover to a second radio access network (RAN-B). The necessary analysis of the service request is effected in the mobile station, since the service is not specified in the currently used radio access network (RAN-A), and hence it is clear that this service is not supported by this network.

Moreover, according to the second embodiment, the process described with respect to FIG. 2 can be carried out in the same way as according to the first embodiment. That is, the process performed in the analysis step S22 can be the same as that shown in FIG. 2. Therefore, a description of this process as carried out in the mobile station MS is omitted here.

Modifications of the Second Embodiment

Regarding the second embodiment, modifications similar to those described in the first embodiment are possible. That is, although a mobile-originated case has been described above, also a mobile-terminated case is possible. In this case, a service request from outside the radio access network in which the mobile station MS is located is to be analysed. The service request can be analysed in the mobile station. However, it is preferable that the network (i.e., the network controlling device MSC or IWU) analyses the service request and initiates the handover, if necessary. In this case, a process similar to the one according to the first embodiment is executed.

Furthermore, in case of both embodiments, it is possible that a service is requested which is neither supported by the first radio access network RAN-A nor by the second radio access network RAN-B. Moreover, it is also possible that a service is requested which is supported by none of other available radio access networks. In this case, an error procedure can be initiated. This can be effected, for example, in a modified analysing step S12 or S22. The error procedure could, for example, issue a corresponding notification to the mobile station and its user.

In both embodiments the service request is analysed as to whether the requested service is supported better by the currently used radio access network RAN-A or by the second radio access network RAN-B. This analysis can be performed, for example, by comparing the requested service with all services available in the radio access network. Thus, especially in the case of the second embodiment, the mobile station MS must have a list of all these services. This list can be provided by the network controlling device during establishment of a call, for example. That is, information regarding the services supported by the respective radio access network could be incorporated in the BCCH signal. During a call, the above information could be incorporated in the DCCH signal.

The above examples of the embodiments describe a handover from a UMTS to a GSM radio access network. However, it is obvious that the handover can also be effected in the other direction.

Hereinafter, an example for such a handover in the other direction is described. It is assumed that a mobile station MS is located in a GSM radio access network. In this situation, a real-time packet service is requested, either by the terminal application or by the core packet network. The network (in the first embodiment) or the mobile station MS (as in the second embodiment) analyses the service request, determines that the mobile station MS is currently in a GSM radio access network that does not support the requested real-time packet service and initiates a handover to a cell of a UMTS radio access network in this area.

In the following, examples of the above-mentioned analysis of the service request according to the invention are described.

Concerning circuit switched services as the requested service, the mobile station MS requests a service by sending a SETUP message to the network. The SETUP message contains (among other things) a Bearer Capability Information Element (BCIE). The BCIE carries detailed parameters related to the requested service, e.g. data rate, connection type (transparent/non transparent), mode (asynchronous/synchronous).

In a mobile terminated call the BCIE comes from ISDN or from the Home Location Register (HLR) of the GSM network.

The (GSM) network control device MSC analyses the BCIE parameters in order to check whether the requested service is supported by the network (and whether the subscriber is entitled to use the service) and to hunt and set up relevant sources in the MSC IWF (interworking function of the network control device MSC).

Within this invention, the BCIE information is used by the network control device (e.g. MSC or BSC or IWU) or by the mobile station MS to decide whether a handover to another radio access network is required.

Concerning packet switched services as the requested service, the mobile station MS requests a service by creating a PDP (Packet Data Protocol) context. This is effected by sending a data packet to the network. The data packet contains (among other things) a Quality of Service (QoS) request. The QoS defines for example whether the requested connection shall be "real time" (i.e. whether a certain data rate is to be guaranteed and a certain delay is not to be exceeded).

In a mobile terminated packet connection the corresponding information comes from the core packet network CN.

The packet network node PNN analyses the QoS parameters in order to be able to deal accordingly with the packets belonging to this context.

Within this invention the QoS information is used by the network control device (e.g. packet data node or BSC or IWU) or by the mobile station MS to decide whether a handover to another radio access network is required.

Figure 5:
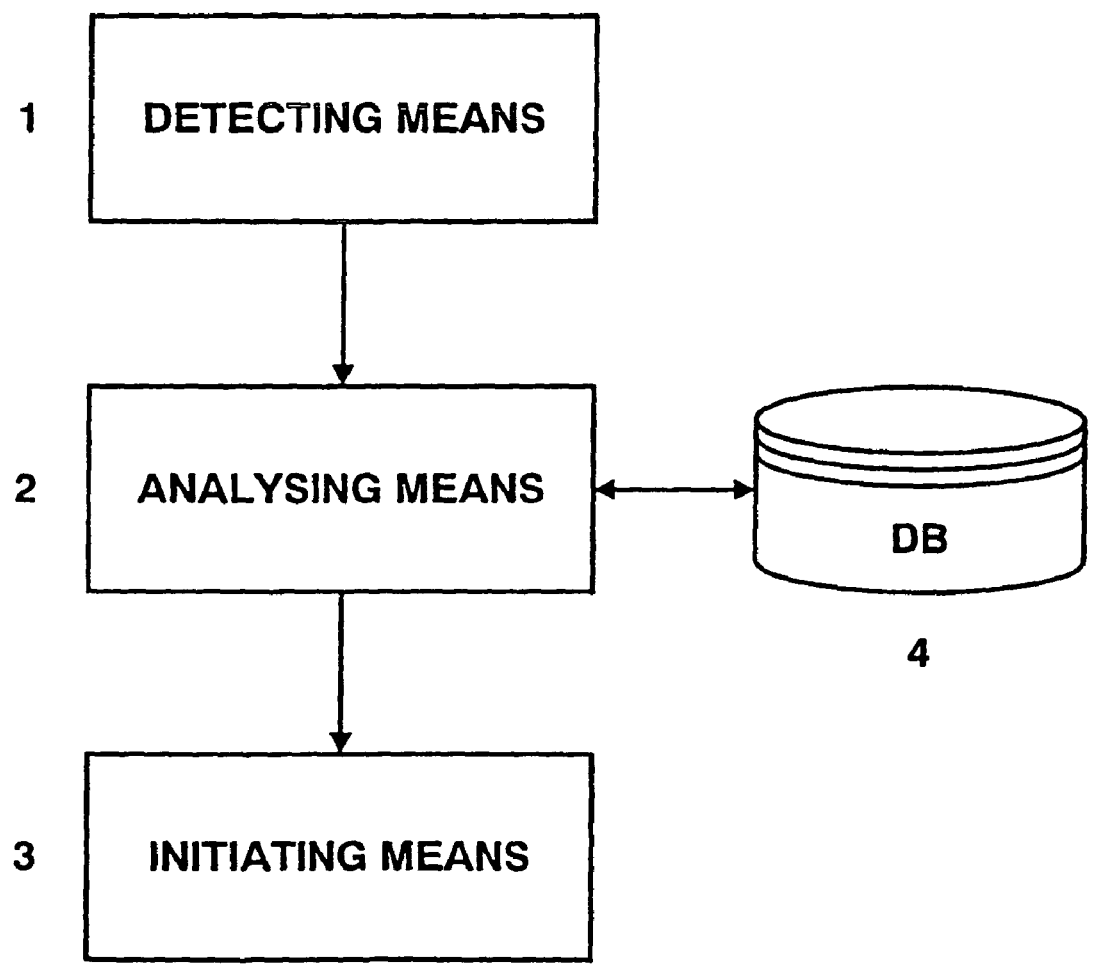
FIG. 5 shows a device in which the method according to the invention is carried out.

In the following, an example of a device for carrying out the above mentioned method according to the first and second embodiments is described with reference to FIG. 5. Reference numeral 1 denotes a detecting means which detects the service request, that is, which performs step S11 of FIG. 2 or step S21 of FIG. 4, i.e. the process shown in FIG. 3. The detected service request is supplied to an analysing means 2, which performs the analysing step S12 of FIG. 2 or step S22 of FIG. 4. In case the analysing means determines that a handover is to be effected, the analysing means 2 supplies a corresponding handover request to an initiating means 3, which performs the initiating step S14 of FIG. 2 or S24 of FIG. 4.

The analysing means 2 can be adapted such that it uses a database 4 for determining the conditions for a sufficient support of the requested service in the different networks. That is, in this database all services of available radio access networks can be stored, including their specifications like bit rate, price of connection, delays etc.

The above description and accompanying drawings only illustrate the present invention by way of example. Thus, the embodiments of the invention may vary within the scope of the attached claims.

The invention claimed is:

1. A method, comprising:
   detecting a request for specific service for a radio transceiver device, wherein said radio transceiver device is configured to operate with a first radio access network and a second radio access network and the radio transceiver device is attached to said first radio access network;
   accessing information on conditions for the first radio access network and the second radio access network to provide sufficient support for a specific service requested by said request for the specific service;
   analyzing whether said first radio access network and said second radio access network meet said conditions; and
   initiating a handover from said first radio access network to said second radio access network when the conditions are met by the second radio access network, but not met by the first radio access network,
   wherein information about service availability in the second radio access network are sent from the second radio access network to the radio transceiver device during establishment of a call.

2. A method according to claim 1, wherein said conditions comprise a condition whether said requested specific service exists in the first radio access network.

3. A method according to claim 1, wherein said conditions depend on each other.

4. A method according to claim 3, wherein one of said conditions for the first radio access network is a given amount lower than the corresponding condition for the second radio access network.

5. A method according to claim 1, wherein said method is performed in said radio transceiver device.

6. A method according to claim 1, wherein said method is performed in a network control device.

7. A method according to claim 6, further comprising:
informing said radio transceiver device of the fact that a handover to said second radio access network is to be initiated.

8. A method according to claim 1, wherein said radio transceiver device is a dual mode phone that is configured to be operated in said first radio access network and said second radio access network.

9. A method according to claim 1, wherein either said first or said second radio access network comprises a global system for mobile communications (GSM) network.

10. A method according to claim 1, wherein either said second or said first radio access network comprises a universal mobile telecommunications system (UMTS) network.

11. A method according to claim 1, wherein said requested specific service comprises a circuit-switched service.

12. A method according to claim 1, wherein said requested specific service comprises a packet service.

13. A method according to claim 1, wherein said radio transceiver device is attached to said first radio access network such that the radio transceiver device is located in a cell of said first radio access network and connected by air with said first radio access network.

14. A method according to claim 13, wherein said radio transceiver device is also located in a cell of said second radio access network.

15. A method according to claim 1, wherein the analyzing further comprises analyzing whether a subscriber using said radio transceiver device is entitled to use said requested service.

16. The method according to claim 1, wherein an error procedure is initiated when the information providing means determines that said requested specific service is not available in any of said networks.

17. An apparatus, comprising:
a processor configured to
detect a request for a specific service for the radio transceiver device, wherein said radio transceiver device is configured to operate with a first radio access network and a second radio access network and the radio transceiver device is attached to said first radio access network,
access information on conditions for said first and said second radio access networks to provide sufficient support for the specific service requested by said request for the specific service,
analyze whether said first radio access network and said second radio access network meet the conditions, and
initiate a handover from said first radio access network to said second radio access network when the respective conditions are met by said second radio access network, but not met by said first radio access network,
wherein information about service availability in the second radio access network are sent to the radio transceiver device upon establishment of a call.

18. An apparatus according to claim 17, wherein said apparatus is configured in said radio transceiver device.

19. An apparatus according to claim 17, wherein said apparatus is configured in a network control device.

20. An apparatus according to claim 17, wherein said analyzer is connected to a database to obtain information regarding said conditions of said requested specific service.

21. An apparatus according to claim 17, wherein said analyzer is configured to analyze whether a subscriber using said radio transceiver device is entitled to use said requested specific service.

22. The apparatus according to claim 17, wherein the apparatus is configured to initiate an error procedure when the information providing means determines that said requested specific service is not available in any of said networks.

23. A computer program embodied on a non-transitory computer readable storage medium, the program configured to control a processor to perform a process, process comprising:
detecting a request for a specific service for the radio transceiver device, wherein said radio transceiver device is configured to operate with a first radio access network and a second radio access network and the radio transceiver device is attached to said first radio access network;
accessing information on conditions for the first and the second radio access network to provide sufficient support for a specific service requested by said request for the specific service;
analyzing whether said first radio access network and said second radio access network meets said conditions; and
initiating a handover from said first radio access network to said second radio access network when the conditions are met by the second radio access network, but not met by the first radio access network,
wherein information about service availability in the second radio access network are sent from the second radio access network to the radio transceiver device upon establishment of a call.

24. An apparatus, comprising:
detecting means for detecting a request for a specific service for a radio transceiver device, wherein said radio transceiver device is configured to operate with a first radio access network and a second radio access network and the radio transceiver device is attached to said first radio access network;
accessing means for accessing information on conditions for said first and said second radio access networks for providing sufficient support for the a specific service requested by said request for the specific service;
analyzing means for analyzing whether said first radio access network and said second radio access network meet the conditions; and
initiating means for initiating a handover from said first radio access network to said second radio access network when the respective conditions are met by said second radio access network, but not met by said first radio access network,
wherein information about service availability in the second radio access network are sent from the second radio access network to the radio transceiver device upon establishment of a call.

* * * * *